July 14, 1953 H. D. CRANDON 2,644,985
CONTACT LENS AND METHOD AND APPARATUS FOR MAKING SAME
Filed March 22, 1947 3 Sheets-Sheet 2

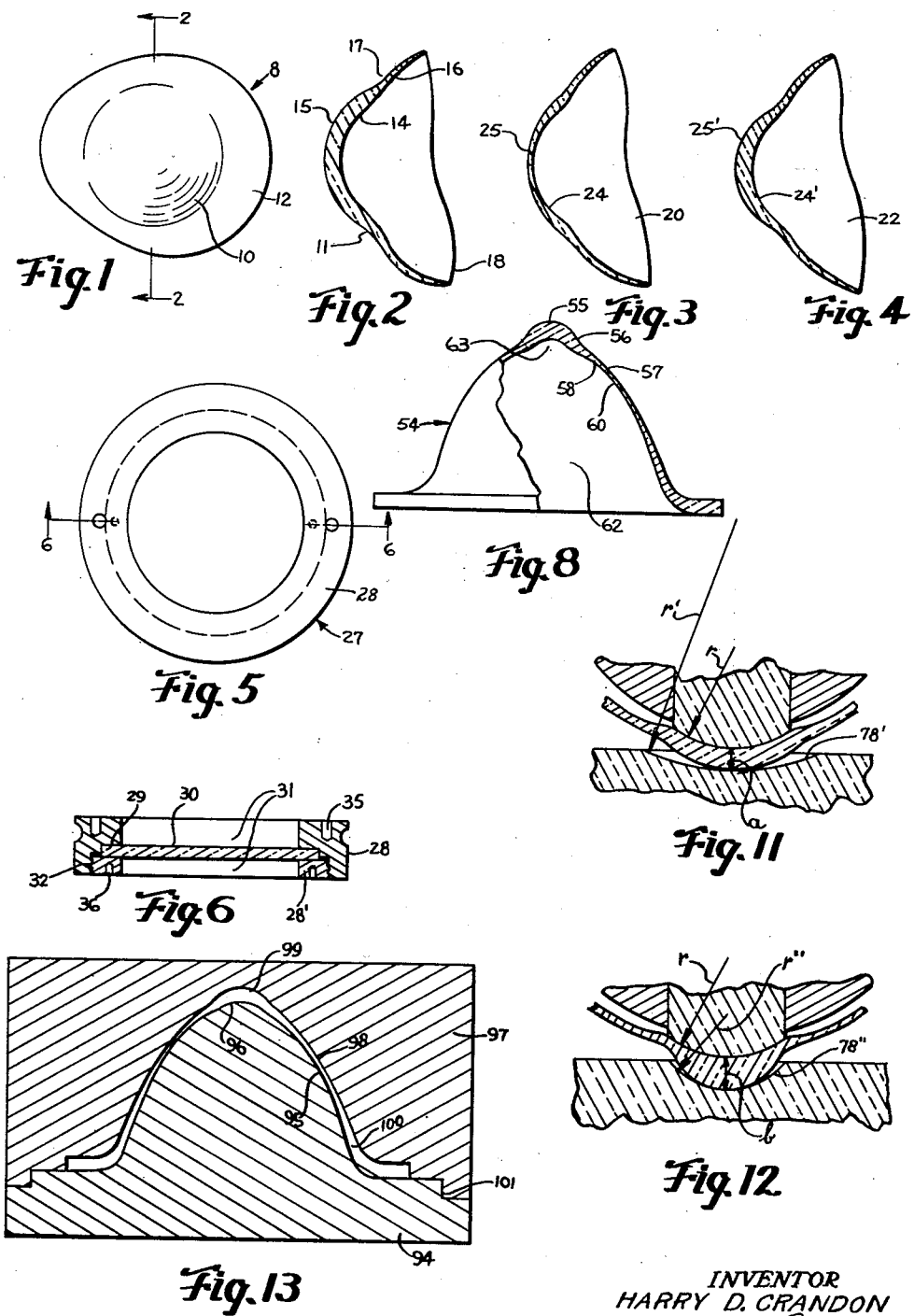

INVENTOR
HARRY D. CRANDON
BY
ATTORNEYS

July 14, 1953          H. D. CRANDON          2,644,985
CONTACT LENS AND METHOD AND APPARATUS FOR MAKING SAME
Filed March 22, 1947                          3 Sheets-Sheet 3
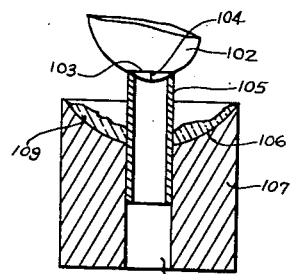
Fig. 14
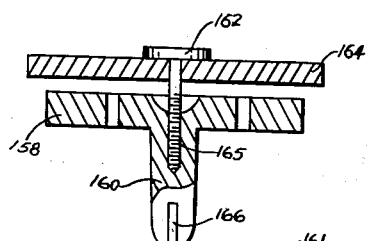
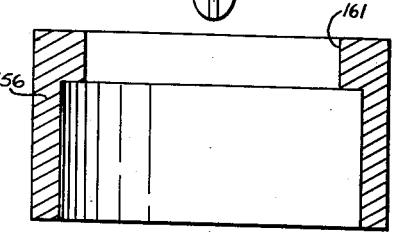
Fig. 17
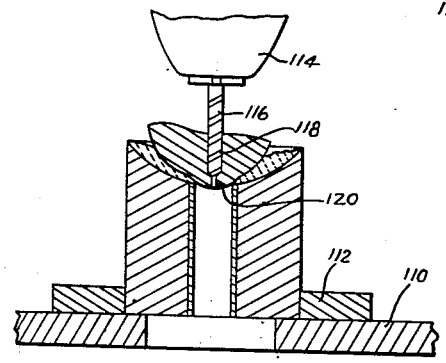
Fig. 15
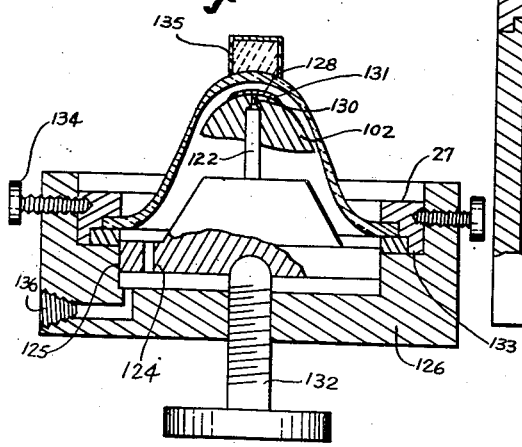
Fig. 16
INVENTOR
HARRY D. CRANDON
BY *Louis L. Gagnon*
*Noble S. Williams*
ATTORNEYS Patented July 14, 1953

2,644,985

UNITED STATES PATENT OFFICE 2,644,985

CONTACT LENS AND METHOD AND APPARATUS FOR MAKING SAME

Harry D. Crandon, Woodstock, Conn., assignor to American Optical Company, Southbridge, Mass., a voluntary association of Massachusetts Application March 22, 1947, Serial No. 736,507

20 Claims. (Cl. 18—55.05)

This invention relates generally to optical elements such as lenses, lens blanks prisms and the like and particularly relates to contact lenses and blanks therefor, as well as to a method and apparatus for making such optical elements.

It is not unusual in the ophthalmic art to make contact lenses partly or entirely of plastic material and several different methods, such as molding, machining and polishing, and heating and pressing, have been employed in attempts to more economically and accurately produce such lenses. Contact lenses, however, embody several different parts or portions which must be accurately formed and finished, and since each of these parts may vary appreciably, depending upon the characteristics of the individual eye being fitted, the making of a good contact lens has been a difficult task. None of the methods mentioned above have proved to be satisfactory for various reasons, such as the time and skill required for producing a satisfactory finished article and the number of trial fittings and subsequent alterations required before an acceptable and comfortable fit was obtained.

Contact lenses embody generally a central or corneal portion arranged to overlie the cornea and limbus area of the wearer's eye and a scleral portion surrounding the central portion and arranged to overlie the sclerotic or white part of the eye. In order to provide the greatest of comfort to the wearer, as well as improved visual acuity, the corneal portion of the lens should be formed so as to position the posterior surface thereof a known predetermined distance from the cornea of the eye and should extend in spaced relation to beyond the super-sensitive limbus area surrounding the cornea. The posterior surface should also be spherically formed to a predetermined curvature and finished to optical accuracy. The anterior surface of the corneal portion should likewise be accurately formed and finished to a similar or a differing predetermined spherical curvature as well as accurately spaced a known amount axially from the inner or posterior surface. Additional requirements of such a contact lens are that the scleral or rim portion of the lens should be of appreciable width and have a curvature which will closely or exactly fit the varying curvature of the sclerotic of the individual eye being fitted so as to provide a uniform pressure of small intensity against all contacted parts of the eye ball. Also, it should peripherally fit the eye ball closely so as to retain in place before the eye the saline or tear solution normally used to form a liquid lens between the contact lens and the cornea. Furthermore, it is often desirable to have the optic built into the corneal portion of the contact lens in such a way as to be "decentered" from the corneal curvature of the lens, in order that the optical axis thereof will be coincident with the patient's line of sight, even though this line of sight may not be axially aligned with the center of the cornea. Another important requirement of a good contact lens is that the corneal and scleral portions thereof should be as thin in section as possible while performing their intended functions thereby causing a minimum of displacement of the eye lid and thus a minimum of pressure or sensation upon the eye ball. Of course they must be, at the same time, of sufficient rigidity to permanently retain their desired shape and prescribed optical properties. It is desirable that the inner and outer corneal and scleral curvatures respectively should blend or join smoothly together and without the junction thereof being noticeable. And furthermore, in contact lenses, it is necessary that the plastic material be so formed that it will be substantially free from internal strains, graininess, bubbles or the like which might otherwise detrimentally affect the optic of the lens or cause the lens over a period of time to change its given shape.

Heretofore, the embodying of these several desirable features into a single finished plastic contact lens has been a tedious if not impossible job. It is, accordingly, an object of the present invention to provide an improved plastic contact lens embodying the several desirable features mentioned above as well as to provide an improved method and apparatus for making same.

It is an additional object of the invention to provide a unitary plastic "preform" or lens blank having an optic provided therein and formed of such predetermined size and shape that it may be readily used in the manufacture of contact lenses arranged to exactly fit individual eye characteristics. The invention also includes a method and apparatus for making such preforms.

Other objects and advantages of the invention will appear from the detailed description that follows when taken in connection with the accompanying drawings, in which:

Fig. 1 is a front view of a plastic contact lens made in accordance with the present invention;

Fig. 2 is a slightly enlarged transverse sectional view taken substantially on the line 2—2 of Fig. 1, the inner and outer corneal curvatures thereof being such as to provide no power or correction in this lens section;

Figure 9:
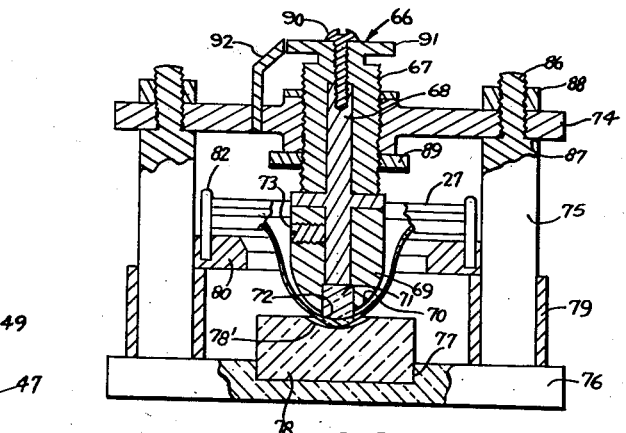
Figure 10:
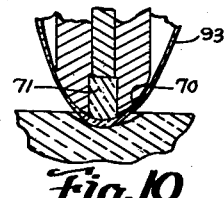
Figure 7:
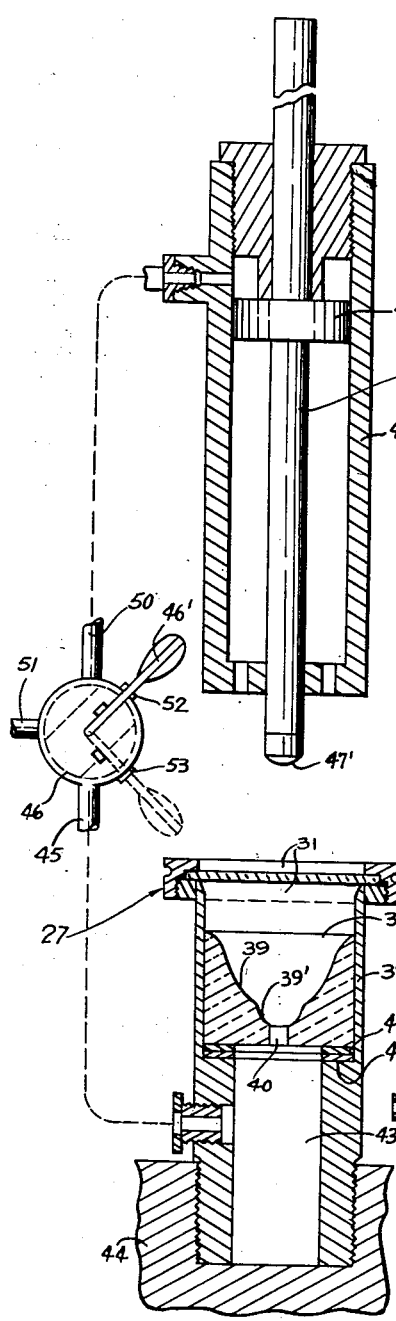
Figure 18:
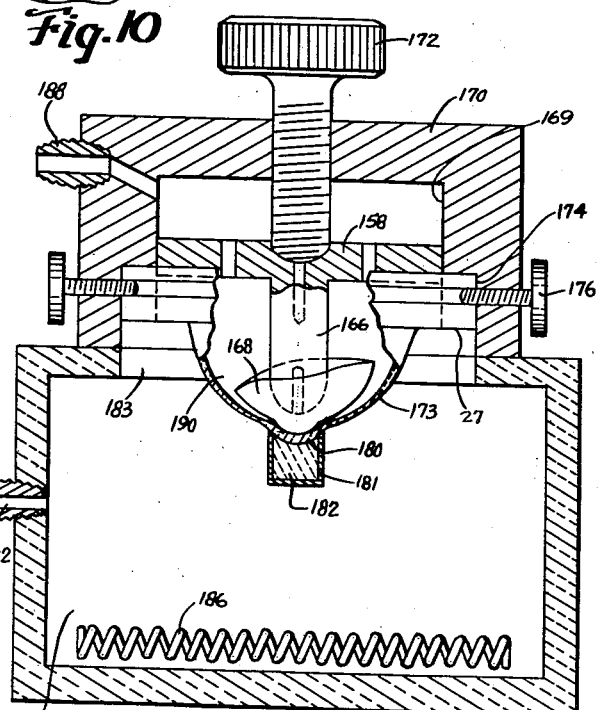

Figs. 3 and 4 are cross-sectional views of contact lens made in accordance with the present invention but embodying respectively minus and plus optical corrections in the corneal portions;

Fig. 5 is a plan view of a clamping ring which may be used in forming the contact lenses of the invention;

Fig. 6 is a transverse sectional view taken substantially on line 6—6 of Fig. 5 and showing a disc of thermoplastic material in place therein;

Fig. 7 is a sectional view of drawing or stretching means for forming the plastic disc into a bell-shaped member or preform;

Fig. 8 is an enlarged partially broken away view of the plastic material formed into the generally bell-shaped member or preform;

Fig. 9 is one form of forming mechanism which may be employed for accurately forming predetermined optical curvatures upon the corneal portion of the preformed plastic member of Fig. 8 as well as an "oversized" thin walled spherical surface adjacent said corneal portion;

Fig. 10 is a fragmentary view of a part of Fig. 9 to show the position of the plastic member after it has been reformed;

Fig. 11 is an enlarged view of parts of forming dies which may be employed in making an optic in the corneal portion having a negative correction or power;

Fig. 12 is a view similar to Fig. 11 but showing dies for making an optic having a positive power or correction formed therein;

Fig. 13 is a sectional view of molding or casting members which may be employed in forming an "oversized" preform or lens blank;

Fig. 14 is a mechanism for accurately positioning a positive cast of a patient's eye in axial alignment upon a centering jig for drilling purposes;

Fig. 15 shows the jig holding the centered positive cast in axial alignment upon a drill press work support;

Fig. 16 is a cast and spacing cap supporting device which may be used in forming "trial" and "custom" contact lenses;

Fig. 17 is a device for centering the marked line of sight of a trial lens and for forming an impression thereof; and Fig. 18 is a supporting device for said impression and an oversized preform with an optic of predetermined power therein positioned over heating means for forming a custom contact lens.

Referring to the drawings in detail and particularly to Figs. 1 and 2, it will be seen that a contact lens 8 made in accordance with the present invention may comprise a central or corneal portion 10, an intermediate portion 11 and an integral scleral portion 12 formed entirely of plastic material. These portions may be so shaped and spaced that a spherical or aspheric inner or posterior surface 14 is formed on the corneal portion and outwardly thereof a second spherical or aspheric surface 15 may be formed with these two surfaces substantially evenly spaced to provide a no-power optic in the lens and arranged to smoothly merge into the inner and outer surfaces 16 and 17, respectively, of the scleral portion 12 in such a manner that no sharp edge or noticeable groove is formed at the intermediate portion where these inner and outer corneal and scleral surfaces merge or intimately blend, such as might otherwise cause discomfort to the wearer's eye ball or lid when the lens is in place for use. It will also be noted that the scleral portion gradually tapers from the region adjacent the intermediate portion toward its outer peripheral edge, as indicated at 18, so that a very small thickness is afforded adjacent its outer marginal edge thereby providing a lens of greater comfort for the wearer.

While Figs. 3 and 4 show cross-sections of lenses somewhat similar to that of Fig. 2 and having their inner and outer corneal surfaces spherically or aspherically formed, it will be noted that the radii of such curvatures may be varied for providing various prescribed optical powers, when desired, for either plus or minus corrections. It will be seen that lenses 20 and 22 differ respectively from Fig. 2 in providing spherical or aspheric curvatures 24, 25 and 24', 25' for corneal portions thereof which give plus and minus corrections to the optics provided thereby. The lenses of Figs. 2, 3 and 4 may be formed readily by the method and apparatus of the present invention as will appear from the description which follows.

In putting into effect the preferred method of the invention there is provided, as best shown by Figs. 5 and 6, a metallic clamping ring 27 comprising two ring parts 28 and 28' for supporting a disc of transparent thermoplastic material from which the contact lens may be formed. The ring part 28 is provided with an annular recess 29 formed internally thereof so as to receive a cast disc 30 of plastic material which is of such diameter as to fit closely within this annular recess. A convenient size plastic disc has been found to be approximately 2 inches in diameter although as little as a 1¾ inch disc or a disc appreciably larger than 2 inches can be used, if desired (with proper adjustments as to the size of apparatus employed). While several different types of thermoplastic materials may be employed, such as polystyrene and polycyclohoxyl methacrylate, as the material for forming the disc 30, the preferred plastic is polymeric methyl methacrylate and this may be purchased under such commonly known trade names as Plexiglas and Lucite. The ring part 28 is internally threaded as indicated at 32 and arranged to receive the part 28' which may be screwed into place in part 28 for clamping the marginal portion of the plastic disc 30 in place. The parts 28 and 28' are provided with central openings 31 for exposing the central part of the gripped disc while subsequent processing steps are being performed thereon. Spaced holes or the like 35 and 36 may be provided in these two rings so that they may be easily turned and clamped against the disc.

When the disc 30 has been properly placed in the ring 27 the disc is heated rapidly to soften the exposed plastic material within the ring without materially changing the temperature of the ring or the plastic clamped therebetween. A convenient and satisfactory heater for such purpose has been found to be an electrical resistance grill providing radiant heat and located within a heat insulating box having an opening of the same size as the openings 31 in its top wall. Such a heater is shown in Fig. 18 and will be described in more detail hereinafter. When the ring and disc have been centered over the opening in the heater for a matter of twenty to thirty seconds depending largely upon the thickness of plastic employed the exposed plastic will be rendered sufficiently soft and pliable that it may be immediately stretched or drawn into an elongated substantially bell-shaped member which for convenience is hereinafter referred to as a "preformed member" or "a preform."

In the forming of such a preformed member for making a contact lens in accordance with the present invention, it is desirable to prevent too much stretching out of the plastic material near the center thereof, for reasons to be presently described, and at the same time desirable to produce a considerable stretching out of the plastic in the area surrounding the central portion (and inwardly of the clamped peripheral edge). To accomplish such results there is provided, as best shown in Fig. 7 an upstanding tubular member 37 of such outside diameter that the opening 31 of ring 27 will fit closely thereover with the plastic disc resting upon the upper relatively thin edge of member 37. Within the member 37 is a forming member or molding block 38 of special predetermined internal or concaved shapes as indicated for example at 39 and 39' and at the lower end of the block is provided a passage 40. An internal shoulder 41 is provided upon the tubular member for supporting the molding block 38 in definite spaced relation to the plane of the top edge of member 37. A convenient manner of adjusting the position of block 38 for different lengths of drawing of the plastic material may be had by use of a plurality of shims 42 of various thicknesses positioned between the block and said shoulder.

The passage 40 communicates with an enclosed vacuum chamber 43 secured to a fixed base plate 44 and pipe 45 extending from the chamber is connected to a conventional control valve 46. A rod 47 is axially aligned with the disc 30, the forming block 38 and the concavities 39 and 39' therein and is guided during axial movement by a fixed housing 48. While it is possible to control the movement of the rod manually or by other means and still have it perform its intended function, it has been found advantageous to form housing 48 in the form of a vacuum cylinder and provide therein a piston 49 carried by rod 47. Movement of rod 47 may thus be controlled by the vacuum control valve 46. A pipe 50 extends from valve 46 to the housing 48 at a location above the upper limit of travel of the piston. A pipe 51 connects valve 46 with a source of vacuum (not shown) and short pipes 52 and 53 are provided in the valve 46 for communication with the atmosphere.

The concave shapes 39 and 39' in the molding block 38, the size and shape of the end 47' of rod 47 and the axial length of drawing of the plastic are carefully controlled so as to provide a substantially bell like shape in the plastic material of adequate size, shape and wall thickness, as will be presently described. After the plastic disc 30 has been properly heated and placed over the end of tube 37, as mentioned above, valve handle 46' is moved from the full line position shown toward the dotted line position. During the first part of this movement the connection between pipe 50 and 51 is shut off and thereafter pipe 50 is connected to short pipe 52 to allow atmospheric pressure to enter pipe 50 and the housing 48 behind piston 49. The weight of rod 47 and piston 49 will cause the spherically shaped and polished lower end 47' of rod 47 to approach the plastic disc. Since this rod, or at least its lower end 47', is formed of a material having high heat conductivity, such as brass, and is at room temperature it will rapidly cool the plastim material at the center of the disc as it comes into contact with the plastic. This tends to "set" the plastic at the center. Different curvatures of the lower end 47' may be used to obtain different rates of setting throughout this central portion. As contact between the rod and disc is made the valve handle is moved further toward the dotted line position to shut off the atmospheric pressure entering the chamber 43 beneath the plastic disc 30 through pipes 45 and 53. The suction line 51 is then connected to chamber 43 to create a differential pressure causing the exposed part of the plastic disc to move downwardly until it is limited by the curved surfaces within the molding block 38. Since the periphery and the central portion of the disc are relatively cool, the stretching out effect which takes place in the plastic occurs substantially entirely in the material between these two parts.

Referring to Fig. 8, it will be seen that the plastic material of disc 30 has been drawn out into a bell-shaped preformed member 54 and that very little, if any, stretching out or thinning out of the plastic material at or near the center 55 has occurred while nearer the edge 56 of the central portion the material has thinned somewhat. Careful choosing of the proper thickness of plastic disc, initially, will supply an adequate thickness at the center 55. This initial thickness will depend largely upon the type of lens being formed and generally a thickness of 1.0 to 2.5 millimeters will be preferred. The curvature of the wall of the forming member 38 and its spacing from the plane of the top of member 37 control the amount of thinning down or tapering of the side wall portion 57 of the bell-like member. The side wall portion 57 thus embodies a relatively thin cross-section or wall thickness adjacent the central portion, as indicated at 58, and a somewhat thinner cross-section at points further removed from the center, as indicated by numeral 60, this being the approximate location at which the lens will be subsequently cut.

The size and shape of the concavities in the member 38 are so chosen as to produce in the plastic bell-shaped member 54 a main cavity 62, somewhat larger than that desired for the scleral portion of the lens blank to be formed therefrom or the finished contact lens formed from said blank. An auxiliary cavity 63 of approximately 7.0 to 9.5 millimeters radius is provided at the center. This drawing requires not more than a few seconds and as soon as the plastic has cooled sufficiently to cause it to set the ring 27 and plastic member may be removed from the drawing or forming apparatus.

The oversized bell-shaped member 54 may be employed for forming any size and scleral shape desired as well as arranged to embody in its central portion any combination of corrective curvatives required for fulfilling the normal range of plus and minus optical powers prescribed by the ophthalmic profession. After the preform or bell-shaped member has been made, the next step in the formation of the contact lens embodies forming the optical or corneal portion of the lens and forming a scleral portion having a spherical curvature which is slightly larger than that required for accommodating the largest size eye cast. It has been found in the ophthalmic profession that normally an interior or posterior surface may be provided in the corneal portion of the contact lens of 8.0 or 8.5 millimeters radius and will give satisfactory results for all cases requiring the use of contact lenses. Obviously a little smaller or little larger radius could be used if desired but probably would not exceed a range from 7.0 to 9.5 millimeters. The outer or anterior curvature of the corneal portion, however, may be given any one of a large number of curvatures to provide a series of plus and minus corrections. Accordingly, the invention employs means for forming such interior and exterior curvatures of predetermined radii as well as means for forming said oversize scleral shape. As best shown in Fig. 9, one such means or device comprises a forming tool 66 which has a threaded bearing 67 arranged to axially receive a post 68. The lower end of the post is arranged to receive a forming member 69 which has accurately formed thereon a spherical curvature 70 which is slightly larger than that normally required to fit the scleral portion of the largest eye cast. Concentric with the post 68 and the forming member 69 is a forming button 71 provided with a second spherical or aspheric curvature 72 for forming the posterior corneal curvature of the contact lens.

The button 71 is preferably formed of glass and has its surface 72 accurately ground and polished. The button is inserted into the forming tool 69 so as to project approximately one half millimeter outwardly of the curvature of the surface 70. This outward spacing provides approximately the clearance required in the finished lens between the posterior lens surface and the cornea of the eye. Glass is employed at this location since it is necessary in order to provide in the formed lens a finished posterior surface of high optical properties. The forming member 69, however, is formed preferably of brass since it takes a high polish and may be easily and accurately formed. The button 71 may be retained seated in the member 69 by friction and the member 69 may be adjustably held in place upon the post 68 by a set screw 73 or the like.

The bearing 67 has threaded engagement with a supporting frame or plate 74 carried by either three or four equally spaced upstanding columns 75 fixedly secured to a base member 76. Centrally positioned within these columns is suitable means such as a recess 77 for accurately centering any one of a plurality of different forming dies 78; said dies being circular in shape and having formed centrally in their upper surfaces, respectively, a graduated series of spherical or aspheric curvatures of predetermined radii, one of which is indicated at 78'. Surrounding each of the columns is a removable spacing ring 79 of such height that together they engage the outer edge portion of a removable limiting ring 80 and maintain same in place. The limiting ring 80 is of such diameter as to be accurately centered by the columns 75 and may have secured thereto vertical centering pins 82 which are of such spacing as to accurately axially locate the clamping ring 27 and the bell-shaped member 54 when they are inserted into the device. At such time the ring 27 will be spaced somewhat above the upper surface of the limiting ring 80 while the center of the bell-shaped member 54 will be in contact with the spherical surface in the die 78.

Since the size and shape of the cavity 62 of the bell-shaped member is slightly larger (see Fig. 9) than the spherical surface 70 of the forming member 69, the member may be located within the cavity (when the parts are properly adjusted in supporting plate 74) with its curved surface 72 in engagement with the center of the bell-shaped member. At such time, the plate 74 will be positioned over the threaded upper ends 86 of the columns 75 and may be clamped against shoulders 87 by nuts 88. The adjustment of the tool 66 relative to the plate 74 allows and compensates for the use of different thicknesses of the plastic material used for forming the bell-shaped member 54, this depending upon the optical prescription required in the finished lens. Generally speaking, however, a 2 millimeter thickness in the plastic stock will suffice for all lenses with minus corrections and for most of the plus lenses.

When the structure shown by Fig. 9 has been assembled for use, an engagement will be effected upon the opposite sides of the plastic preform 54 at the center thereof by the spherical surface 78' and the spherical surface 72. A nut 89 may be provided for locking the forming tool in adjusted position and a screw 90 retains the post 68 in place within the bearing 67. A calibrated flange 91 may be provided upon the upper end of this bearing and a pointer 92 secured to plate 74 serves as means for indicating the various positions of adjustment of the surface 72 relative to the surface 78'.

The assembled structure with the preformed member 54 in place are then placed in a conventional oven which is at a temperature ranging from 170° to 200° C. and heated from approximately 5 to 7 minutes. The assembly is then removed from the oven and cooled, preferably rapidly, to room temperature before the ring and plastic member are removed. During the heating step, care must be exercised to avoid heating for too long a period for fear of fracturing the plastic material at its thin scleral section. Because of the phenomena known as "plastic memory," the plastic material which has been drawn or stretched into the bell-shaped member 54 tends to return or move back, when thus heated, into its original shape. In so doing while in the device of Fig. 9, this plastic memory will cause the material to return toward its original shape until it is restrained or confined by the members 69, 71 and 78, and by the clamping ring 27 moving into engagement with the limiting ring 80. The preform 54 will shrink or draw into intimate contact with the oversized spherical surface 70 of the forming member 69 and in so doing the plastic material will bridge across between the surfaces 70 and 72, tending to draw tangentially to both curves and thus producing a smooth "blending" of both inside and outside surfaces of the plastic material where the corneal and scleral portions join. Fig. 10 shows the plastic material after it has moved into contact with surface 70 and drawn tangent to both curves. In this manner, no sharp edge or surface requiring further polishing or treatment is produced. Instead, an oversized lens blank 93 with a finished optic and smooth glassy finished inner and outer junctions, which are almost indistinguishable, is produced.

The vertical height of the spacing collars 79 serves to control the distance that the clamping ring 27 can move before it is limited by ring 80 and such limiting of the "return" of the plastic preform may be used to determine the wall thickness of the scleral portion as well as the amount of the tapering down of the plastic wall portions. If a thinner or a thicker cross-section is desired in the scleral portion, different sets of collars 79 of greater or less height may be employed. The members 67, 68 and 69 are made of brass, while the columns 75 are made of aluminum. The coefficients of expansion of these metals are different and accordingly these metals are employed so that during heating and cooling their respective expansions and contractions will substantially compensate each other and, accordingly, maintain the distance between the center of surface 72 and the center of surface 78' constant.

Figs. 11 and 12 are intended to show in more detail how both plus and minus powers may be readily formed in the plastic bell-shaped member 54. It will be seen from these two figures that by the use of original plastic stock of different thicknesses and by the different extents of drawing of the plastic, as well as the speed at which the center is cooled and the sidewall portion is drawn, it is possible to form different shapes and amounts of plastic material at the central portion. In Fig. 11, wherein a minus power as indicated by radii $r$ and $r'$ is to be formed, although the center thickness at $a$ is not great the adjacent plastic must first be stretched out considerably. This is necessary in order that the plastic, when confined between mold surfaces 72 and 78' and re-heated, will return toward its original shape and, between mold surfaces 72 and 78' where it is prevented from a complete return, it will take on the shapes of said surfaces. In Fig. 12, a plus correction is indicated by radii $r$ and $r''$. While the center thickness at $b$ is greater than $a$, the plastic adjacent thereto thins out more rapidly toward the edge of the corneal portion. In each case, however, it will be noted, the central portion of the preformed plastic is so shaped relative to its respective molding surface 78' or 78'' that the plastic, when re-heated, progressively engages these surfaces from the center outwardly. This is important in order to prevent air being trapped between the plastic and concave mold surface 78' or 78''. The behavior of the plastic being drawn out and being returned partially to its original form is much like that which might be expected if a sheet of rubber were stretched out in like manner and then allowed to return, except with the plastic material the steps are performed only while the plastic is rendered soft or pliable by the proper application of heat.

Thus preformed bell-shaped members having a large variety of prescribed plus and minus optical powers, as well as ones of zero optical powers, may be conveniently and accurately formed by the steps just described. An alternate method of forming an equivalent series of "oversized" bell-shaped lens blanks may be accomplished in the following manner. In Fig. 13 is shown an inner mold half 94 upon which is accurately formed a large curved surface 95 and a smaller curved surface 96 which have their adjacent edges smoothly blending into one another. The smaller curved surface is preferably of an 8.0 or 8.5 millimeter radius, but may be slightly larger or smaller if desired. A series of complementary mold halves may be provided to function with mold half 94 for forming or casting bell-shaped lens blanks generally similar to drawn lens blank 93 of Fig. 10.

One such complementary or outer mold half is shown at 97 in Fig. 13 and is provided with a large curved surface 98 and a smaller curved surface 99 which blend smoothly together. These curved surfaces on members 94 and 97 thus form a mold cavity 100 of proper size and shape to produce an "oversized" bell-shaped cast lens blank, when the members are assembled together and centered by a shoulder 101 or the like, and the resultant bell-shaped lens blank will have an optical power at its center depending directly upon the inner and outer small curved surfaces provided by the mold halves. By selectively using with the mold half 94, a plurality of outer mold halves 97 having different curvatures formed at their central portions, it is possible to produce bell-shaped lens blanks having a variety of different accurately formed optical powers in their central portions.

Into the mold cavity 100 is placed or injected, in known manner, a suitable quantity of a liquid monomer, or a powdered polymer or a mixture of liquid monomer and powdered polymer of one of the plastic materials mentioned previously and by the proper application of pressure, depending upon the type of material being used, while the mold halves are heated to proper molding or casting temperatures, said bell-shaped blanks may be formed. It is here noted that the foregoing injection and compression molding and casting processes are somewhat more expensive than the drawing process described above due largely to the great expense involved in the accurate forming and polishing of the mold halves 94 and 97. Also great care must be exercised to avoid excessive strains in the plastic when high pressures are used and to avoid graininess when compression molding is employed. Furthermore, the casting method is relatively slow. For these reasons, the drawing process is preferred.

Such drawn and cast oversized lens blanks having prescribed optical powers formed in the corneal portions thereof may be modified in the following manner for producing contact lenses which will accurately fit the particular scleral curvatures of any individual's eye. A preferred procedure comprises the taking of an impression or negative reproduction of the patient's eye in known manner, by an ophthalmologist or physician, and from this impression a positive cast or model or modified plaster of Paris or dental stone may be made. When prescription contact lenses are being ordered, such a cast will be supplied by the physician and marked merely with an "L" or "R" and a line extending transversely across the back surface thereof to indicate the transverse axis of the eye. In order that this original cast will not be in any way injured or damaged, it is desirable, but not necessary, to make a replica or duplicate thereof and such a duplicate cast is indicated by numeral 102 in Fig. 14. If the line on the original cast is traced by an indelible pencil, such reference mark will be automatically transferred to the duplicate. A transverse line may be drawn from the ends thereof across the front face of the duplicate and the corneal portion thereof may be easily traced or outlined on the cast as indicated by a circle at 103. By drawing one or more diameters 104 across the circle, it is easy to establish the exact center of the corneal portion.

With such reference marks added to the duplicate cast, it may be placed upon the upper end of a hollow circular member 105 and readily centered thereon by sighting through the member, at which time the cast and hollow member may be pressed toward the concave surface 106 of a supporting block 107 having a guiding bore 108 for the hollow member 105 and in so doing the scleral part of the cast will be pressed into adhesive engagement with plastic molding clay or the like 109 positioned on concave surface 106. The clay serves to temporarily secure the duplicate cast in a fixed centered position upon the block 107 so that it may be supported on a base 110 and centered by a centering ring 112 secured thereto and thus axially aligned with a drill press (not shown). While in this position a chuck 114 on the drill press carrying a small drill 116 may be brought into engagement with the back surface of the duplicate cast and a bore 118 drilled therein in such a manner that it extends through the greater part of the cast. Thereafter a very fine drill may be employed to form a smaller bore 120 from the bottom of bore 118 to the front surface of the cast.

After the duplicate cast has been prepared in the manner just described, it may be positioned upon a round pin 122 which is of such size that it closely fits the bore 118. This pin is fixedly carried by a circular supporting plate 124 provided with an outer circumference of such a size that it closely fits within a circular recess 125 formed in a supporting frame 126. (Recess 125 is preferably of the same diameter as the opening 31 in the ring 27.) A metallic clearance cap 128 of preferably from approximately 0.4 to 0.6 millimeter thickness and having a radius of preferably either 8.0 or 8.5 millimeters is positioned upon the duplicate cast and centered over the small bore 120 by a small integral pin 130. If desired, however, a cap thickness of as little as 0.1 millimeter or as much as 1.0 millimeter could be used. The cap is of such diameter that it will extend to completely cover the corneal portion of the cast and will generally range from 11 to 15 millimeters. If desired, a small quantity of wax or other suitable filler material 131 may be put around the cap 128 and smoothed over to fill the space between the curves on the cap and cast and blend one into the other. At times, it may be desirable to form a "recast" of the cast 102, cap 128 and filler material 131 (when present), since same obviously will be somewhat stronger than the drilled member 102 when subjected to the steps of the method employed. Such a recast may be formed upon a pin and member like pin 122 and member 124.

An adjusting screw 132 carried centrally in the lower part of the supporting frame 126 is in a retracted position when the plate 124, cast 102 and cap 128 are placed in the frame and thereafter the clamping ring 27 carrying a drawn or cast oversized bell-shaped lens blank, having a plus or a minus or a no power optic at its center, are positioned within and centered by a second recess 133 in frame 126 and secured by clamping screws or the like 134. The screw 132 is then adjusted to move the plate, cast and cap upwardly and to bring the cap 128 into engagement with the optic in the plastic material. A wax filled cap or the like 135 is then placed over the optic in the plastic member so as to insulate same when heat is applied to the exposed plastic. Thereafter the assembled structure may be placed over a heater of the type shown in Fig. 18 and heated from 20 to 30 seconds, or just enough to soften the thin plastic wall only. If the plastic member has been formed by drawing, it will tend to return to its original shape by plastic memory but if it has been formed by molding or casting it will be necessary to attach a suction line to the opening 136 to cause the thin walled member to be drawn inwardly. In either case, the thin plastic wall will move while heated into contact with the cast 102 and take on the exact scleral shape thereof. The assembly is then cooled to room temperature before the plastic material is removed from the assembly and the ring 27. In this way, the particular curvature of the scleral portion of the cast is given to the inner surface of the lens blank while at the same time the center portion is definitely spaced a small predetermined amount from the corneal portion of the cast. The plastic material will bridge more or less tangentially from the edge of the cap to the surface of the cast and thereby cause a smooth blending of the curves at the junctions thus formed. Such a shaped plastic lens blank may then be cut along predetermined lines and have its edge polished to provide a contact lens which will fit exactly the particular shape of an individual's eye.

If the optic in this lens is the exact power required by the patient, a finished custom contact lens will be the result. However, if only a close approximation of the exact optical power has been formed into such a contact lens, it may be employed merely as a trial lens. (Such a trial lens, however, has great advantage over the ordinary trial lens with a spherical scleral portion of only approximate eye size since its spacing before the cornea may vary greatly and cannot be readily estimated for refraction purposes. In the lens of the present invention, the spacing is known and is retained during the making of a custom contact lens having the exact power required.)

With such a correctly shaped trial lens, the physician or opthalmologist may test the exactness or correctness of the scleral fit of the lens and may refract the patient's eye with the lens in place. He may also mark upon this trial lens the line of sight of the patient and any changes in the marginal limits of the lens which may be desired. The marked trial lens indicated by the numeral 140 in Fig. 17 may then be returned to the maker and from this trial lens a custom lens having the exact power required may be readily produced.

The lens 140 having its line of sight marked thereon, as indicated by the numeral 142, may be readily centered upon the recasting device 144 since this device is provided with a central circular cavity 145 and a central aperture 146. This aperture is of small diameter but of appreciable length and is in direct alignment with a lamp 150 so that a needle of light will shine through the aperture and indicate on the lens 140 when the marked point 142 has been aligned with said aperture. In order to hold the trial lens so aligned over the circular cavity 145, it is provided with a duct 152 connecting same with a vacuum line 153 controlled by a shut off valve 154. A glass plate 155 or the like is retained in place beneath the aperture 146 to prevent air from entering the aperture 146 and the cavity 145. Accordingly, when valve 154 is opened, a suction may be applied to the lower surface of the lens 140 to hold the lens in its properly adjusted and aligned position.

When lens 140 has been so secured, a circular collar 156 may be slipped over an annular shoulder 157 concentric with the aperture 146, after which plaster of Paris or other suitable material is poured into the lens 140. A circular plate 158 having a stud 160 extending downwardly centrally from its lower surface is positioned in a circular opening 161 in the collar 156 and arranged so that its lower end will extend into the plaster of Paris while still in an unset condition. The extent to which the stud is to extend into the plaster of Paris is determined beforehand and may be controlled in various ways. In the present instance, it has been found convenient to provide an adjustable screw 162 so as to extend through a plate 164 and into a threaded central opening 165 in the plate 158, with plate 164 being of such diameter that it will engage the upper surface of the collar 156 and limit the inward or downward travel of the plate 158. Rotation of screw 162 will adjust the amount that the stud extends into the plaster of Paris. A groove or the like 166 may be provided on the otherwise rounded lower end of stud 160 to prevent rotation or movement of the plaster thereon when it has set about the stud.

The plate 158 having a plaster of Paris form 168 secured thereto is then removed from the structure shown in Fig. 17 and placed within a circular chamber or recess 169 in a supporting frame 170. This recess is of such internal diameter that it closely receives said plate. An adjusting screw 172 extending centrally through frame 170 is at such time retracted so that the clamping ring 27 with an oversized plastic bell-shaped cast or drawn lens blank 173, having an accurately formed optic of prescribed optical power formed therein, may be positioned within a circular recess 174 and retained in place by screws or the like 176. Thereafter, adjusting screw 172 is rotated into engagement with the plate 158 and serves to move the plate and the plaster form 168 axially into engagement with the optic 180 of the member 173.

A heat insulating button or cap 181 filled with a low melting wax 182 may be adhered to the exposed surface of the optic and serve to protect the optic while the assembled structure is inverted and placed over an opening 183 in a heating chamber 184. The chamber is provided with a radiant heating coil 186 having terminals (not shown) adapted to be connected to an external source of electrical energy. The assembly is allowed to remain over the heater for a time sufficient only to heat the exposed thin wall portion of the plastic member 173. No heat should be allowed to reach the optic 180. Obviously, overheating of the plastic member and the protective button 181 will cause the wax to soften and the button to drop off and serve as an indication that too much heat has been applied. Heating of the member 173 will only require ordinarily in the neighborhood of 20 to 30 seconds. If the member 173 has been drawn, it will return by plastic memory toward its original shape and assume the scleral shape of the form 168, but if it is a cast bell-shaped member, a suction line may be connected to a connector 188 communicating with chamber 169 and the vacuum within chamber 199 will serve to draw the thin wall of the member 173 into engagement with the form 168. (Obviously, an air pressure could be applied through connector 192 and heating chamber 184 and would serve as readily for producing a differential pressure for effecting movement of the heated plastic material into engagement with the form 168.)

When the plastic member 173 has been caused to fit closely the scleral curvature of the form 168 and has cooled so that it will retain such shape, it may be cut along a predetermined marginal line and polished to provide a custom contact lens having a tapered thin walled scleral portion adapted to closely fit the contour or curvature of an individual's eye, having a properly spaced corneal portion provided with an optic of proper plus or minus prescription and having said optic properly aligned with the line of sight of the individual.

While much of the foregoing description relates primarily to the formation of trial and custom contact lenses, it should be understood that the formation of other types of optical elements such as ophthalmic and instrument lenses, prisms and the like could also be readily formed of plastic material by the method employing the phenomena of plastic memory. In forming such lenses, prisms and the like, the plastic material would be similarly heated and stretched out appreciably, after which forming surfaces would be positioned in predetermined spaced relation adjacent opposite sides of or even in contact with parts of the opposite surfaces of the stretched plastic and the plastic thereafter allowed to return by plastic memory toward its initial or cast position until parts thereof engage and are confined by said opposed forming surfaces, producing the size and shape of element desired. Also variously shaped optical elements such as Schmidt corrector plates, toric lenses and even ophthalmic lenses containing prism corrections therein may be readily and accurately formed by following the teachings of the invention. Should a particular case require, it would even be possible to form toric, atoric or prismatic corrections into the corneal portion of a contact lens.

Having described my invention, I claim:

1. The method of forming a contact lens or the like having an optic of predetermined characteristics formed centrally therein and having a surrounding portion adapted to fit closely the scleral curvature of an individual eye comprising forming an optic having said predetermined characteristics in the central portion of a piece of plastic material, protecting said formed optic from the application of heat in such a manner that it will retain its given optical characteristics, subjecting said surrounding portion of the plastic material to the application of heat to render same pliable and positioning a positive cast of said individual eye in predetermined relation relative to said optic, and causing said heated plastic material to move into engagement with said cast and to thereby assume the particular scleral surface characteristics of said individual eye.

2. The method of forming a contact lens of the proper size, shape and optical prescription required for accurately fitting the individual characteristics of a person's eye comprising the steps of centering over the corneal portion of a positive cast of said eye a corneal clearance cap having a predetermined thickness, diameter and outer curvature, said cast with the cap providing a bearing surface having a desired compound curvature for the inner shape of the contact lens, forming plastic material into a unitary bell-shaped member having in the central portion thereof an optic of predetermined inner and outer curvatures and having a portion surrounding said central portion which is of a slightly larger size than the size of said bearing surface formed by the cast and cap, positioning said plastic member and said bearing surface formed by the cast and cap in adjacent relationship, with the center of said bearing surface being located adjacent the central portion of said plastic member, heating the surrounding portion of said plastic member to soften same while the central portion is protected from the heat, causing said softened surrounding portion to move into engagement with the adjacent portions of said bearing surface while the central portion thereof remains substantially unchanged, retaining said surrounding portion in contact with said bearing surface until the plastic material has cooled sufficiently to set the plastic in its new position, and trimming and finishing said surrounding portion along predetermined lines to produce a contact lens.

3. The method of forming a contact lens of the proper size, shape and optical prescription required for accurately fitting the individual characteristics of a person's eye comprising the steps of centering over the corneal portion of a positive cast of said eye a corneal clearance cap having an outer surface of predetermined curvature and having a predetermined thickness, the outer surface of said cast and cap thereby producing a bearing surface having a desired compound curvature for the inner shapes of the contact lens, forming plastic material into a unitary bell-shaped member having in the central portion thereof an optic of predetermined inner and outer curvatures and having a relatively thin surrounding wall portion which is of a slightly larger size than said bearing surface formed by the outer surfaces of said cast and cap, positioning said plastic member and said bearing surface having such a compound curvature in adjacent relationship, heating the thin walled portion of said plastic member to soften same while protecting the central portion thereof from the heat, causing said softened thin wall portion to move into engagement with adjacent portions of the bearing surface while the central portion thereof remains substantially unchanged, retaining said thin walled portion in contact with said bearing surface until the plastic material cools sufficiently to set the plastic in its new position and trimming the plastic along predetermined lines to produce a contact lens.

4. The method of forming a blank for use in the manufacture of a contact lens or the like, which blank will have an optic of predetermined curvatures and a surrounding portion embodying a thin wall of concave shape which is of slightly larger size than the sclerotic of a person's eye, comprising the steps of heating an area of a sheet of plastic material of predetermined thickness to render the area pliable, chilling a small area within said heated area while simultaneously causing said heated area surrounding the small area to stretch and assume a given concaved shape, retaining said stretched plastic substantially unchanged in its concaved shape while confining said small area between accurately formed and located optic producing surfaces, and heating said plastic material to soften same and cause it to return partially to its initial shape to thereby form between said surfaces an optic having accurately formed opposed surfaces.

5. The method of forming a thin walled bell-shaped plastic lens blank having an optic formed adjacent the center thereof comprising the steps of clamping a sheet of thermoplastic material of predetermined thickness so as to expose a section thereof, heating the exposed section for a time sufficient to render same pliable, cooling the center of the heated section while simultaneously stretching the heated section to form same into a bell-shaped member having a relatively thin wall portion surrounding a relatively thicker central portion, holding the plastic material in its stretched concaved condition until it is cooled sufficiently to acquire a set therein, positioning the central portion of said member between accurately located opposed molding surfaces of predetermined curvature, heating the plastic material so as to cause the plastic near the center to soften and move into engagement with parts of said opposed molding surfaces while preventing any substantail change in shape in the thin walled portion, and holding the plastic material in such restrained and confined condition until it has cooled sufficiently to acquire a set in all parts thereof.

6. The method of forming a contact lens of the proper size, shape and optical prescription required for accurately fitting the individual characteristics of a person's eye comprising the steps of centering over the corneal portion of a positive cast of said eye a corneal clearance cap having a predetermined thickness and outer curvature, forming a recast of said cast having the cap seated thereon, said recast having an outer surface duplicating that of the curved shape of the combined outer surfaces of said cast and cap seated thereon, forming plastic material into a unitary bell-shaped member having in the central portion thereof a predetermined optical power and a thin walled portion surrounding said central portion which is of a slightly greater size than said recast, positioning the central portions of said plastic member and said recast in adjacent relationship, heating the surrounding portion of said plastic member to soften same while the central portion thereof is protected from the heat, causing said softened surrounding portion to move into engagement with adjacent portions of said recast while said central portion remains substantially unchanged, and retaining said surrounding portion in contact with the adjacent portions of said recast until said plastic material has cooled sufficiently to set the plastic in its newly acquired shape.

7. The method of forming a contact lens of the proper size, shape and optical prescription required for accurately fitting the individual characteristics of a person's eye comprising the steps of centering over the corneal portion of a positive cast of said eye a corneal clearance cap having a predetermined thickness, diameter and outer spherical curvature, forming a recast of said cast and cap, said recast having an outer surface duplicating the curved shape of the combined outer surfaces of said cast and cap seated thereon, forming plastic material into a unitary transparent bell-shaped member having in the central portion thereof an optic and a thin walled portion surrounding said central portion which is of a slightly greater size than said recast, positioning the optic of said plastic member and said recast in adjacent relationship, heating the surrounding portion of said plastic member to soften same while the central portion thereof is protected from the heat, causing said softened surrounding portion to move into engagement with the adjacent portions of said recast while said central portion remains substantially unchanged, retaining said surrounding portion in contact with said recast until the plastic material thereof has cooled sufficiently to set the plastic, and trimming and finishing said surrounding portion along predetermined lines to produce a contact lens.

8. The method of forming a contact lens or the like having an optic and a surrounding scleral portion of predetermined shape comprising selecting a piece of plastic material of a thickness equal to or slightly greater than the maximum thickness required in the finished lens, heating an exposed section of said piece of plastic to render it pliable, cooling the center of the heated plastic section while the material adjacent thereto is being stretched, holding said plastic in its stretched condition until it has cooled sufficiently to acquire a set therein, forming an optic in the material at the center of the plastic material, positioning the stretched plastic material and a positive cast of a person's eye in adjacent predetermined relationship, with the corneal portion of said cast adjacent the portion which has the optic and with the scleral portion of the cast within the stretched plastic, heating the stretched plastic to cause it to move into intimate contact with parts of the scleral portion of said cast adjacent thereto while protecting said optic from said heat.

9. The method of forming a contact lens of predetermined shape and provided with an optic in its central portion comprising clamping a piece of plastic material of a thickness equal to or slightly greater than the maximum thickness desired in the finished lens so as to expose a section thereof, heating said exposed section of the plastic to render it pliable, rapidly cooling the central portion of said heated section while stretching said heated section so as to produce a bell-shaped member having a relatively thin wall surrounding the central portion, holding said plastic in its stretched condition until it has cooled sufficiently to acquire a set therein, forming an optic in the material at the central section, positioning the stretched bell-shaped plastic member containing said optic and a form having the shape of a portion of a person's eye in adjacent relationship, heating the stretched plastic to cause it to move into contact with said form while protecting said optic from the heat, retaining the bell-shaped member in contact with said form until the plastic material has cooled sufficiently to acquire a set therein, and trimming and finishing the bell-shaped member along predetermined lines to produce said contact lens.

10. A method of forming a contact lens of predetermined shape and provided with an optic in its central portion comprising the steps of clamping a piece of plastic material so as to expose a section thereof, heating the exposed section for a time sufficient to render it pliable, cooling the central portion of the heated section while stretching the heated section to form a bell-shaped member having a thinned out area surrounding the central portion, holding the plastic in its stretched condition until it has cooled sufficiently to acquire a set therein, forming an optic in the material at the central section, heating the stretched section while protecting the formed optic, causing said thinned out area to move into intimate engagement with curved parts of a member having a shape duplicating a part of the sclerotic of a person's eye, and retaining the thinned out area in engagement with said member until it has cooled and effected a set to retain the plastic material in its new acquired shape.

11. The method of forming a contact lens of predetermined shape and provided with an optic in the central portion thereof comprising the steps of clamping a sheet of plastic material so as to expose a section thereof, heating the exposed section for a time sufficient to render it pliable, rapidly cooling the central portion of the heated section in such a manner as to provide a curvature therein of approximate predetermined radius and to prevent excessive thinning out of the plastic thereof while stretching the heated section surrounding the central portion to form a bell-shaped member having a relatively thin wall portion, holding the plastic member in its stretched condition until it has cooled sufficiently to acquire a set therein, forming an optic of predetermined optical power at the central portion of said bell-shaped member with said optic having an inner curvature of substantially the same radius as said first mentioned radius, heating the stretched section while protecting the formed optic, causing the thin walled portion to move into engagement with a member having a shape duplicating a part of the sclerotic of a person's eye, retaining the thin wall portion in engagement with said member until it has cooled sufficiently to acquire a set, and trimming and finishing said thin wall portion along a predetermined line to produce said contact lens.

12. The method of forming a contact lens of predetermined scleral shape and provided with an optic of predetermined characteristics in its central portion which is accurately axially aligned with the line of sight of a person's eye comprising the steps of forming a plastic bell-shaped member having an optic in its central portion and having a relatively thin side wall portion, positioning said bell-shaped member adjacent a form of predetermined shape and providing an area duplicating the scleral portion of said person's eye, heating said thin wall portion and causing said thin wall portion to move into intimate engagement with said scleral portion, trimming said plastic member along a predetermined line to form a trial lens, inserting the trial lens in the eye of an individual to test the fit thereof, marking on the trial lens the line of sight of said person, forming a replica thereof upon an aligned supporting member, positioning said replica and member in a predetermined location relative to a plastic bell-shaped member having the prescribed optic formed at its center, heating said bell-shaped plastic member while protecting the optic formed therein and causing said member to move into engagement with adjacent portions of said replica, retaining said replica and plastic member in fixed relation until the plastic material thereof has cooled and acquired a set, and finishing said member along a predetermined line to provide said contact lens.

13. Apparatus for use in the manufacture from heated plastic material of bell-shaped blanks for use in the manufacture of contact lenses or the like comprising holding means for gripping plastic sheet material so as to expose an intermediate portion thereof, forming means spaced from said holding means and in alignment therewith for contacting and shaping the heated plastic while held by said gripping means, drawing means for causing the plastic to assume the shape of said forming means, and cooling means for simultaneously cooling the central part of said exposed heated portion to prevent undesired thinning out of the central portion while the adjacent plastic is being drawn to the shape of the forming means.

14. Apparatus for forming bell-shaped blanks having optics positioned in the central portions thereof for use in the manufacture of plastic contact lenses or the like comprising holding means for supporting plastic sheet material so as to expose an area therein, heating means for heating said exposed area of the plastic sheet material, shaping means for causing the exposed area of said plastic to be deformed from its initial shape and to assume a predetermined bell-shaped form, a high heat conducting engagement member for engaging and rapidly cooling the central portion of said heated area while said plastic is assuming said bell-shaped form to thereby prevent undesired thinning out of the central portion, said engagement member having a surface shape controlled for forming in said central portion a surface of predetermined curvatures.

15. Apparatus for providing in a bell-shaped blank of plastic material for use in the forming of contact lenses and the like an optic of predetermined curvatures, said apparatus comprising a first forming member and a second forming member, said first forming member being provided with a highly finished first surface of predetermined curvature and a second larger surface concentric with said first surface and spaced slightly axially of said first surface, said second forming member being provided with a highly finished concaved surface of predetermined curvature axially aligned with said first and second surfaces, said first surface and said concave surface being relatively movable and adapted to engage the inner and outer surfaces respectively of the central portion of said bell-shaped plastic blank, means for releasably maintaining said forming members in predetermined spaced relation, holding means for gripping the outer portions of said bell-shaped member for preventing unlimited movement thereof, and heating means for heating the plastic material of said bell-shaped member to cause it to move into contact with said first, second and concave surfaces.

16. The method of forming from thermoplastic material an optical element having predetermined optical surface characteristics on the opposite faces thereof, said method comprising heating said thermoplastic material for a period sufficient to render same pliable, causing said heated plastic material to stretch and to be deformed from its original shape, positioning said stretched and deformed plastic material between a pair of spaced molding surfaces of predetermined surface curvatures, the surface curvature of said molding surfaces being controlled according to the surface curvatures desired for the optical element, causing said plastic material while heated to a pliable state to return toward its original shape and to move into intimate confined engagement with portions of said molding surfaces, and retaining said plastic material so confined until the plastic material has cooled sufficiently to acquire a set therein.

17. The method of forming a blank for use in the manufacture of contact lenses, said method comprising the steps of heating an area of a thermoplastic sheet to render said area pliable, positioning said sheet with the heated area thereof between a rigid concave molding surface, and a rigid convex molding surface, one of said rigid molding surfaces embodying a circular shaped central surface portion of controlled surface curvature surrounded by an annular-like surface portion of a controlled different surface curvature and the other rigid molding surface having a controlled surface and being of a size and circular shape to substantially coincide with the circular shaped central portion of the first rigid molding surface, said heated area of the sheet being of a size greater than that of said latter molding surface, and moving one of said rigid molding surfaces toward the other to form in the center of said heated area of the sheet surface curvatures on the opposed sides thereof corresponding substantially to the surface curvature of the contacting rigid molding surfaces while restraining the outer portions of said plastic sheet against movement and drawing the heated area of the sheet about said center portion thereof to the shape of the annular-like surface portion of the first rigid molding surface, and allowing said plastic to cool and set to said shape.

18. The method of forming a contact lens or the like from a cup-shaped blank of plastic material having internal strains therein capable of being relieved under the subjection of the blank to heat which strains cause said blank to shrink when so heated comprising the steps of protecting the central portion of said blank from the application of heat in such a manner that it will retain its initial shape and shrinking the surrounding portion of said blank to the shape of an inwardly positioned molding surface under the application of heat, and with said molding surface being of a shape controlled to reproduce substantially the scleral shape of the scleral portion of the individual's eye with which the finished lens is to be used.

19. The method of forming a contact lens or the like from a cup-shaped blank of plastic material having internal strains therein capable of being relieved when subjected to heat of an amount sufficient to relieve said strains, which strains cause said blank to shrink when so heated, comprising the steps of shaping the surfaces of the central portion of said blank to obtain a desired inner curvature and optical power for said central portion, protecting said shaped central portion from subsequent application of heat in such a manner that it will retain said shape, and then shrinking the surrounding portion of said blank to the shape of an inwardly positioned molding surface under the application of heat, said molding surface being of a shape controlled to reproduce substantially the scleral shape of the scleral portion of the individual's eye with which the finished lens is to be used.

20. A blank for use in forming a contact type lens comprising a bell-shaped member of transparent polymerized plastic material, said bell-shaped member having a central optic portion formed with an inner concave and an outer convex surface, the curvature of said outer surface being controlled according to the optical correction characteristics required for the resultant lens to be formed from said blank, said bell-shaped member having a continuous side wall surrounding said central optic portion and constituting the sides of said member and terminating in an outwardly extending annular flange-like holding portion, said side wall having a thickness progressively decreasing from adjacent the central optic portion and flange-like holding portion of said member to an area of least thickness intermediate said portions, the inner surface of said side wall having varying circumferential dimensions corresponding approximately to the varying exterior circumferential dimensions of the sclera of the average person's eye whereby the resultant shape of said inner surface approximates the shape of the adjacent exterior of the eye, said circumferential dimensions being of sizes substantially greater than the corresponding circumferential dimensions of said average person's eye, and said wall portion further having "plastic memory" rendering it capable at temperatures substantially above body temperature to shrink in size whereby said blank may under the application of heat be caused to have the inner surface of its side wall accommodated to a molding surface having a shape reproducing substantially the shape of the sclera of a person's eye for which the resultant lens is prescribed to permit the obtaining of a lens having a desired scleral fit as well as optical correction.

HARRY D. CRANDON.

References Cited in the file of this patent

UNITED STATES PATENTS

| Number | Name | Date |
|---|---|---|
| 669,331 | Thurber | Mar. 5, 1901 |
| 1,339,789 | Rothwell et al. | May 11, 1920 |
| 1,457,804 | Wigand | June 5, 1923 |
| 1,671,577 | Gluckin et al. | May 29, 1928 |
| 1,998,356 | Brown | Apr. 16, 1935 |
| 2,027,962 | Currie | Jan. 14, 1936 |
| 2,142,445 | Helwig | Jan. 3, 1939 |
| 2,166,215 | Lloyd | July 18, 1939 |
| 2,168,651 | McCoy | Aug. 8, 1939 |
| 2,178,873 | Feinbloom | Nov. 7, 1939 |
| 2,208,583 | Hoop | July 23, 1940 |
| 2,229,613 | Strauch | Jan. 21, 1941 |
| 2,237,744 | Mullen | Apr. 8, 1941 |
| 2,240,157 | Gagnon | Apr. 29, 1941 |
| 2,241,415 | Moulton | May 13, 1941 |
| 2,251,477 | Wisman | Aug. 5, 1941 |
| 2,300,210 | Dittmer | Oct. 27, 1942 |
| 2,330,837 | Mullen | Oct. 5, 1943 |
| 2,332,792 | Gross et al. | Oct. 26, 1943 |
| 2,337,701 | Weinberg | Dec. 28, 1943 |
| 2,357,806 | Borkland | Sept. 12, 1944 |
| 2,369,758 | Sheldon | Feb. 20, 1945 |
| 2,444,420 | Borkland | July 6, 1948 |

FOREIGN PATENTS

| Number | Country | Date |
|---|---|---|
| 510,946 | Great Britain | Aug. 8, 1939 |

OTHER REFERENCES

Cry-O-Vac Bulletin P-1. (Copy in Div. 15.) Printed in U. S. A. 1939.

Obrig: Text "Contact Lenses," pages 256 and 257, published by Chilton Co., Philadelphia, Pa., 1942. (Copy in Division 7.)